United States Patent
Burgett et al.

(10) Patent No.: US 9,665,535 B1
(45) Date of Patent: May 30, 2017

(54) SYSTEM AND METHOD FOR UTILIZING MOBILE CONFIGURATION SERVICES

(71) Applicants: Joseph P. Burgett, Scottsdale, AZ (US); Christopher Rollin Morris, Katy, TX (US)

(72) Inventors: Joseph P. Burgett, Scottsdale, AZ (US); Christopher Rollin Morris, Katy, TX (US)

(73) Assignee: CA, Inc., New York, NY (US)

( * ) Notice: Subject to any disclaimer, the term of this patent is extended or adjusted under 35 U.S.C. 154(b) by 670 days.

(21) Appl. No.: 13/840,208

(22) Filed: Mar. 15, 2013

(51) Int. Cl.
G06F 15/177 (2006.01)
H04L 29/08 (2006.01)
G06F 9/445 (2006.01)

(52) U.S. Cl.
CPC ............. G06F 15/177 (2013.01); G06F 8/60 (2013.01); H04L 67/10 (2013.01)

(58) Field of Classification Search
CPC .................................. G06F 8/60; H04L 67/10
See application file for complete search history.

(56) References Cited

U.S. PATENT DOCUMENTS

| | | | | |
|---|---|---|---|---|
| 8,291,045 B2 * | 10/2012 | Stone | ..................... | G06Q 30/02 705/1.1 |
| 8,612,933 B1 * | 12/2013 | Gill | ........................... | G06F 8/30 717/105 |
| 2006/0143601 A1 * | 6/2006 | Concha | ..................... | G06F 8/61 717/170 |
| 2006/0218629 A1 * | 9/2006 | Pearson | ............ | G06F 17/30873 726/8 |
| 2012/0240065 A1 * | 9/2012 | Linietsky | .................. | G06F 8/61 715/762 |
| 2013/0318155 A1 * | 11/2013 | Ichikawa | ................ | H04L 67/02 709/203 |

\* cited by examiner

Primary Examiner — Lashonda Jacobs
(74) Attorney, Agent, or Firm — Baker Botts L.L.P.

(57) ABSTRACT

In one embodiment, a system includes a memory, an interface configured to communicate with a network and a processor configured to receive, from a first source on the network, an unconfigured application. The processor may be further configured to send a first request to the second source for configuration parameters associated with the unconfigured application and receive, from the second source in response to the request, a first set of configuration parameters. The processor may also be configured to configure the unconfigured application using the first set of configuration parameters.

20 Claims, 4 Drawing Sheets

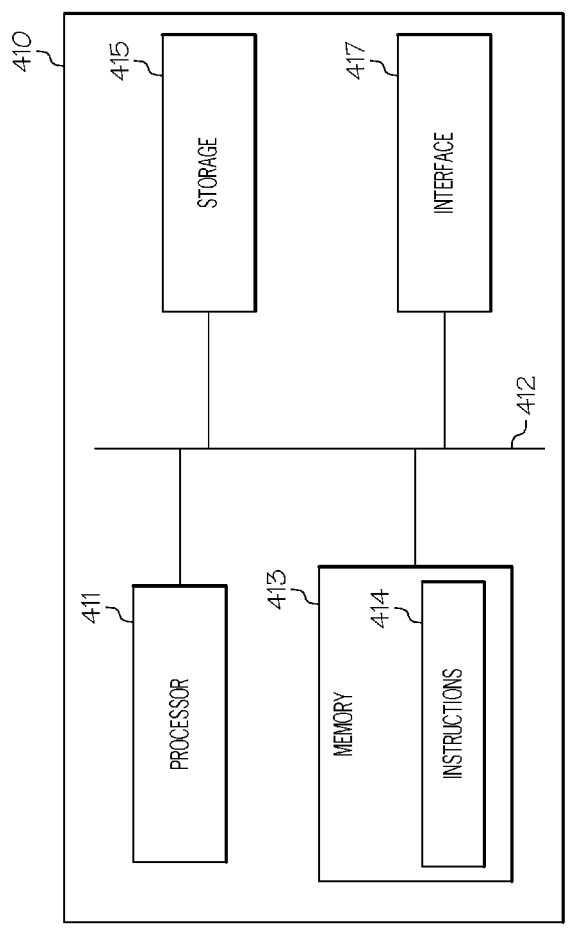

SYSTEM AND METHOD FOR UTILIZING MOBILE CONFIGURATION SERVICES

BACKGROUND

Currently, business applications may be developed completely in-house, may be customized versions of applications developed and customized by an outside development firm, or may be developed by market or industry partners. In any instance, the applications may be distributed and installed to company devices through the company's private network. The application may thereafter require some further configuration depending on the user of the computing device. For instance, some users may require additional or different application functionality than other users. Because such individualized development and/or configuration requires a substantial amount of time for each business, this method of distributing applications may be quite costly. In addition, multiple customized versions of an application may not be distributed through common application repositories due to certain requirements or restraints placed upon the developers of the application by the repository service.

BRIEF SUMMARY

In one embodiment, a system includes a memory, an interface configured to communicate with a network and a processor configured to receive, from a first source on the network, an unconfigured application. The processor may be further configured to send a first request to the second source for configuration parameters associated with the unconfigured application and receive, from the second source in response to the request, a first set of configuration parameters. The processor may also be configured to configure the unconfigured application using the first set of configuration parameters.

According to certain embodiments of the present disclosure, the request comprises information transmitted to the first client through a hyperlink. According to certain embodiments of the present disclosure, the request comprises identification information that includes a username and password. According to certain embodiments of the present disclosure, the configuration parameters include one or more of the following: a label associated with the configuration parameters; a version associated with the configuration parameters; attributes associated with communication on the network; image files to be used with an application installed on the first client; user information associated with a user of the first client; directories associated with the application installed on the first client; and parameters associated with functionality of the application installed on the first client.

BRIEF DESCRIPTION OF THE DRAWINGS

Aspects of the present disclosure are illustrated by way of example and are not limited by the accompanying figures with like references indicating like elements.

FIG. 4 illustrates a block diagram of a computer that may be used in accordance with particular embodiments of the present disclosure.

DETAILED DESCRIPTION

Figure 1:
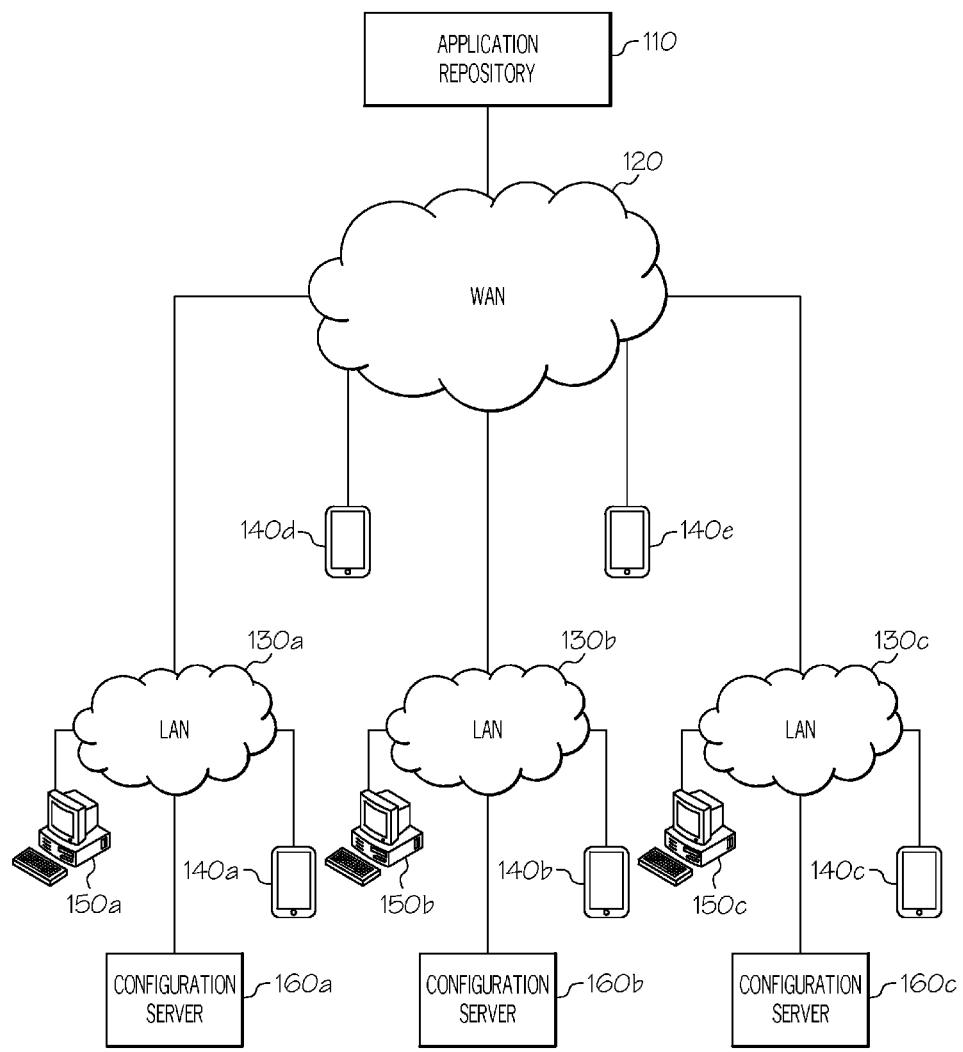
FIG. 1 illustrates a system that includes an application repository, a wide area network, local area networks connected to the wide area network, and computing devices and configuration servers connected to the local area networks in accordance with particular embodiments of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or by combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 illustrates a system 100 that includes an application repository 110 connected to a wide area network (WAN) 120, which connects multiple local area networks (LANs) 130. Each LAN 130 connects certain computing devices 140a-c and 150a-c to a configuration server 160a-c, with devices 140a-c operable to receive configuration parameters from any of configuration servers 160a-c. Computing devices 140d-e may be connected to one or more of LANs 130 through WAN 120, and may be operable to receive configuration parameters from any of configuration servers 160a-c. WAN 120 and LANs 130 may be any interconnecting system capable of transmitting audio, video, signals, data, messages, or any combination of the preceding. WAN 120 may include one or more of a public switched telephone network (PSTN), a public or private data network, a local, regional, or global communication or computer network such as the Internet, a wireline or wireless network, an enterprise internet, or any other suitable communication link. In some embodiments, LANs 130 may represent private data networks (e.g., a corporations private data network), and may include one or more virtual LAN (VLAN) services running on WAN 120, such as layer 2 virtual private network (L2VPN) services or virtual private LAN services (VPLS).

Currently, business applications may be developed completely in-house, may be customized versions of applications developed and customized by an outside development firm, or may be developed by market or industry partners. In any instance, the applications may be distributed and installed to company devices through the company's private network. The application may thereafter require some further configuration depending on the user of the computing device. For instance, some users may require additional or different application functionality than other users. Because such individualized development and/or configuration requires a substantial amount of time for each business, this method of distributing applications may be quite costly. In addition, multiple customized versions of an application may not be distributed through common application repositories due to certain requirements or restraints placed upon the developers of the application by the repository service.

Accordingly, in particular embodiments of the present disclosure, an application may be distributed to a computing device (e.g., devices 140a-e of FIG. 1) without certain configuration parameters by a first source (e.g., application repository 110), while the certain configuration parameters for the application may be distributed to the computing device by a separate, second source (e.g., configuration servers 160a-c). Once the parameters are received by the device, the application may then, on a first startup or runtime, be configured according to the received configuration parameters. This may allow application developers to develop a generic, unconfigured application that may be distributed through a common application repository service. The application may then be customized and configured by configuration parameters that are developed by someone other than the application developer (e.g., a customer or client of the application developer).

In particular embodiments, the first source may be a common application repository, such as APPLE APP STORE, GOOGLE PLAY, or BLACKBERRY WORLD, while the second source may be a server located within a company's network. In some embodiments, the application may be deposited into the first source by a company that develops applications and distributed to a plurality of devices that reside in different company's networks, wherein the devices retrieve company-specific configuration parameters. For instance, an application developer may distribute a generic or unconfigured application to devices associated with different companies by uploading the application to a common and well-known application repository. The application may then be downloaded by the devices associated with the different companies. The devices may then retrieve a company's specific configuration parameters, and the application may be configured and branded according to the company's desires during run-time on first use. To distribute the company-specific parameters, each company may setup a configuration server that distributes the configuration parameters to the devices running the generic application. In some embodiments, the application may transmit a request to the configuration server asking for the configuration parameters. The request may include user information associated with a user of the application. The configuration server may then listen and respond to the application's configuration request by providing the configuration parameters. Accordingly, this process may alleviate the need to make a custom version of an application for each company the application is distributed to, thus negating the need for repetitive development to support many disparate configurations of the application.

In particular embodiments, the application may be configured according to multiple sets of configuration parameters. For instance, a device may receive a set of configuration parameters from a first configuration server and a second set of configuration parameters from a second configuration server. The device may then configure the application such that a user may use the application according to each set of configuration parameters. In some embodiments, this may be accomplished using multiple profiles within the application that allow the user to use the application with one set of configuration parameters in one instance and use the application with a second set of configuration parameters in a second instance.

Figure 2:
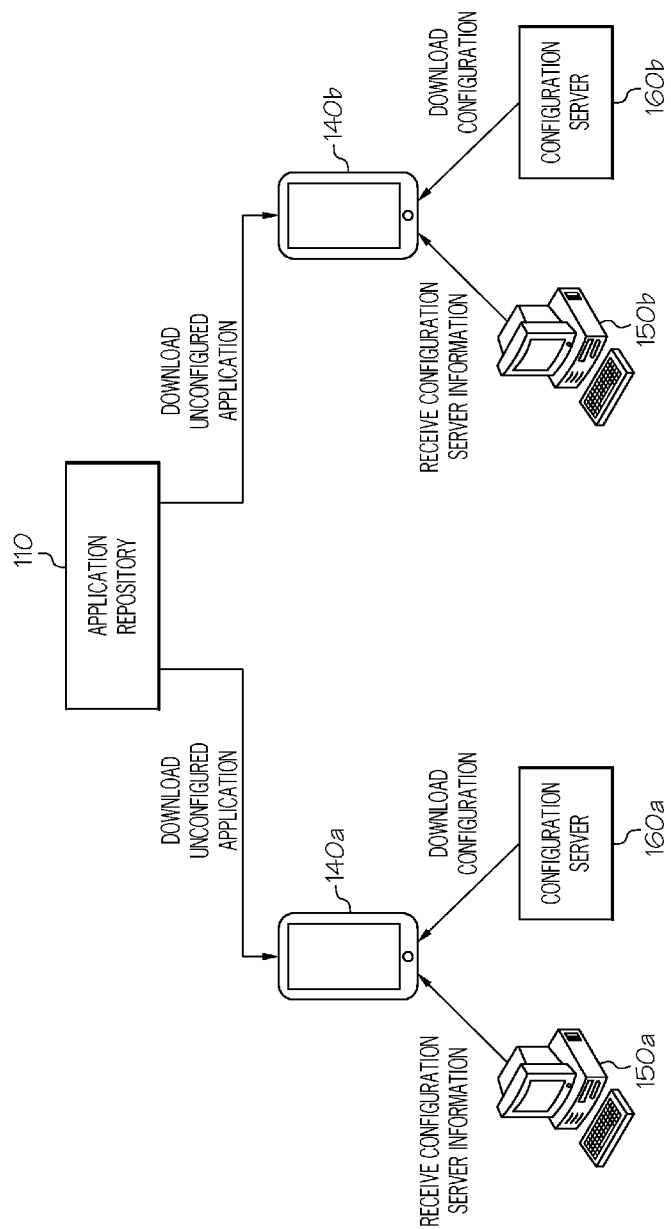
FIG. 2 illustrates an example method for delivery and configuration of an application within the system of FIG. 1 in accordance with particular embodiments of the present disclosure.

FIG. 2 illustrates an example method for delivery and configuration of an application in the system of FIG. 1 in accordance with particular embodiments of the present disclosure. Through the method of FIG. 2, an application developer may be able to develop a single version of an application that allows businesses to further configure using it's own custom configurations. Accordingly, devices 140a and 140b may be able to download the same application and receive different configuration parameters associated with the application from different configuration servers 160a and 160b that are associated with different companies. In addition, devices may receive multiple sets of configuration parameters from multiple configuration servers. For example, device 140a may be able to download a set of configuration parameters from each of configuration servers 160a-b and run the application according to each set of parameters separately.

The method begins with an application being uploaded to application repository 110 by an application developer. The application repository, in some embodiments, may be a well-known or universal application distribution center, such as APPLE APP STORE, GOOGLE PLAY, or BLACKBERRY WORLD. In particular embodiments, the application may be a generic or unconfigured version of the application. For instance, the core functionality of the application may be in place, but certain images or user information may not yet be in place. As an example, the application may contain placeholders for company-specific images or branding, or for information associated with the user of the device (e.g., a user's name, contact information, account configuration information, company profile information, etc.). From there, computing devices 140a and 140b may each download the unconfigured application from application repository 110. Thus, the application downloaded by each device is the same, even though the devices may be associated with different companies that require different configurations. Before or after downloading the application, device 140 may receive information (e.g., an email message, a short message server (SMS) text message, or information from a Quick Response (QR) code) from a user of computer 150 that includes configuration server information, such as an address for configuration server 160. For example, device 140 may receive an email message from an administrator that includes a hyperlink (e.g., a uniform resource locater (URL)) directing device 140 to configuration server 160 for retrieval of configuration parameters.

Once the application is installed, devices 140a and 140b may then request and download configuration parameters from configuration servers 160a and 160b, respectively. This may be done, in some embodiments, by supplying the application with the configuration server address, which may be done manually or automatically through a hyperlink. In some embodiments, the user of device 140 may simply click the hyperlink and have his or her user information transmitted directly to the configuration server 160 through the hyperlink. In particular embodiments, the configuration parameters retrieved by devices 140a and 140b may be different from each other. In some embodiments, the company that uses the application on its devices may determine how it will look, feel, and function. For instance, tools supplied by application developer may used to choose and or configure the options available for each application configuration. The request from the device may include, in some embodiments, a username and pass word associated with the user of the device. Based on the username and password, the configuration server may determine whether the user is authorized to use and or access the requested configuration parameters. If authorized, the configuration server may provide customized configuration parameters for the user. For instance, the configuration parameters may store individualized configuration parameters that include the user's account or company profile information, and/or may grant the user access or deny the user access to particular functionalities within the application.

In particular embodiments, devices 140 may be operable to periodically check whether the configuration parameters used by the installed application are current. This may be performed through some communication with the configuration server 160 from which the device received a set of configuration parameters. If the device 140 determines that the configuration parameters are not current, it may update the configuration parameters by sending a request for the updated parameters to the configuration server 160. The configuration server 160 may then send the updated configuration parameters to the device 140 in response. Alternatively, configuration servers 160 may be operable to periodically check the configuration parameters on devices 140, and update the configuration parameters if configuration server 160 determines that such configuration parameters do not match the configuration parameters stored (e.g., if the configuration parameters on the device are not current or up to date).

Figure 3:
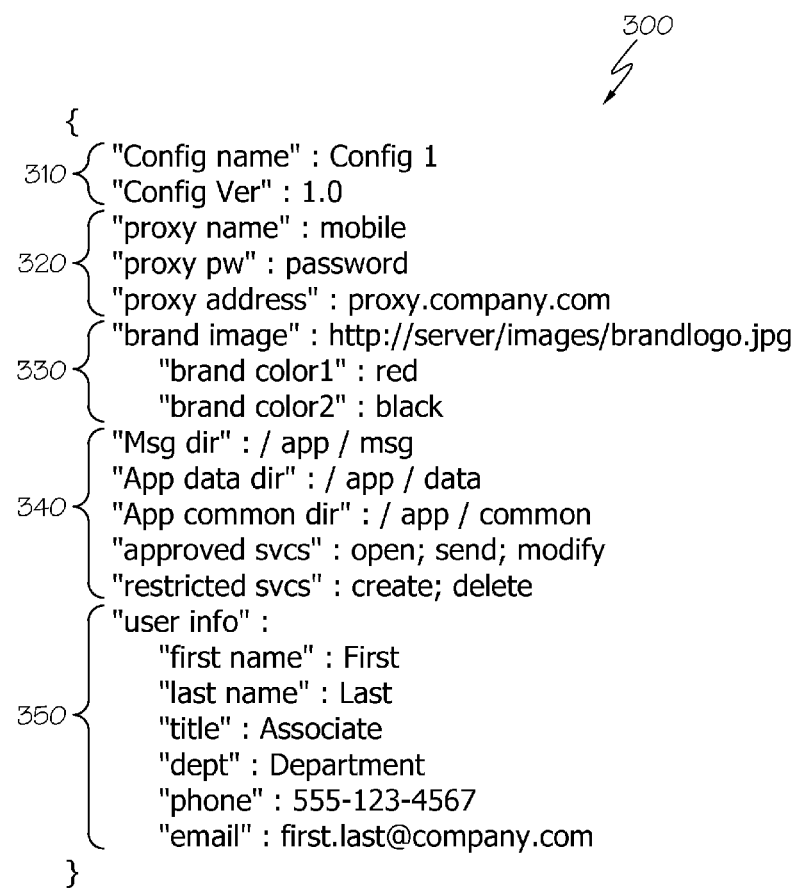
FIG. 3 illustrates example configuration settings that may be used in the method of FIG. 2 in accordance with particular embodiments of the present disclosure.

FIG. 3 illustrates example configuration settings 300 that may be used in the method of FIG. 2 in accordance with particular embodiments of the present disclosure. Any suitable configuration parameters and/or settings may be included in configuration settings 300. Examples may include, but are not limited to, corporate branding information and/or images (e.g., font, background colors, logos, etc.), a location of the corporate branding information and images, welcome messages to be displayed on the device, support messages to be displayed on the device, support contact information, infrastructure server information, infrastructure connection information (e.g., proxy server information), certain features of the app to enable or disable, colors to be displayed on the application's user interface, localization information, server information by region, audio tones or tunes to be used within the application, a location of the audio tones or tunes, screen layout information, attributes of identity profiles, security information (e.g., a password required to activate the application for use), or a location of alternate or redundant configuration servers to use as a fail safe.

For instance, referring to FIG. 3, configuration settings 300 may include metadata 310 that describes the configuration settings. For example, metadata 310 may include a label and a version number associated with the configuration parameters as shown in FIG. 3. Configuration settings 300 may also include communication attributes 320, which may allow a device to communicate on the network. Examples of communication attributes 320 may include a proxy server name, proxy server password, and proxy server network address as shown in FIG. 3. Configuration settings 300 may also include branding information 330 related to images or colors to be included or used in the configured application. The branding information may include a link to image files as shown in FIG. 3, or may include the actual images for use with the application. The branding information may also include primary and secondary colors to be used in certain portions of the application as shown in FIG. 3.

Configuration settings 300 may also include access information 340. Access information 340 may include local or remote directories associated with the application that may be accessed by the configured application as shown in FIG. 3. Access information 340 may also include parameters associated with functionality of the application installed on the first client. The parameters may include services that the configured application is allowed to access and/or services that the application is restricted from accessing as shown in FIG. 3. Configuration settings 300 may also include user information 350 associated with a user of the configured application. The user information 350 may include, for example, a name of the user, a job title of the user, a department that the user works in, and contact information for the user as shown in FIG. 3.

FIG. 4 illustrates a block diagram of a computer 410 that may be used in system 100 of FIG. 1 in accordance with particular embodiments. For instance, in particular embodiments, one or more computers 410 may be incorporated in application repository 110, computing devices 140 and 150, and/or configuration server 160 of FIG. 1. Each computer 410 may include its own respective processor 411, memory 413, instructions 414, storage 415, interface 417, and bus 412. These components may work together to perform one or more steps of one or more methods and provide the functionality described herein. For example, in particular embodiments, instructions 414 in memory 413 may be executed on processor 411 in order to perform one or more methods (e.g. the method of FIG. 3) using information received by interface 417. In certain embodiments, instructions 414 may reside in storage 415 instead of, or in addition to, memory 413.

Processor 411 may be a microprocessor, controller, application specific integrated circuit (ASIC), or any other suitable computing device operable to provide, either alone or in conjunction with other components (e.g., memory 413 and instructions 414) IT infrastructure monitoring functionality. Such functionality may include providing a ranking of the most troublesome or unreliable components of an IT infrastructure, as discussed herein. In particular embodiments, processor 411 may include hardware for executing instructions 414, such as those making up a computer program or application. As an example and not by way of limitation, to execute instructions 414, processor 411 may retrieve (or fetch) instructions 414 from an internal register, an internal cache, memory 413 or storage 415; decode and execute them; and then write one or more results to an internal register, an internal cache, memory 413, or storage 415.

Memory 413 may be any form of volatile or non-volatile memory including, without limitation, magnetic media, optical media, random access memory (RAM), read-only memory (ROM), flash memory, removable media, or any other suitable local or remote memory component or components. Memory 413 may store any suitable data or information utilized by computer 410, including software (e.g., instructions 414) embedded in a computer readable medium, and/or encoded logic incorporated in hardware or otherwise stored (e.g., firmware). In particular embodiments, memory 413 may include main memory for storing instructions 414 for processor 411 to execute or data for processor 411 to operate on. In particular embodiments, one or more memory management units (MMUs) may reside between processor 411 and memory 413 and facilitate accesses to memory 413 requested by processor 411.

Storage 415 may include mass storage for data or instructions (e.g., instructions 414). As an example and not by way of limitation, storage 415 may include a hard disk drive (HDD), a floppy disk drive, flash memory, an optical disc, a magneto-optical disc, magnetic tape, a Universal Serial Bus (USB) drive, a combination of two or more of these, or any suitable computer readable medium. Storage 415 may include removable or non-removable (or fixed) media, where appropriate. Storage 415 may be internal or external to computer 410 (and/or remote transceiver 220), where appropriate. In some embodiments, instructions 414 may be encoded in storage 415 in addition to, in lieu of, memory 413.

Interface 417 may include hardware, encoded software, or both providing one or more interfaces for communication (such as, for example, packet-based communication) between computer 410 and any other computer systems on network 110. As an example, and not by way of limitation, interface 417 may include a network interface controller (NIC) or network adapter for communicating with an Ethernet or other wire-based network and/or a wireless NIC (WNIC) or wireless adapter for communicating with a wireless network. Interface 417 may include one or more connectors for communicating traffic (e.g., IP packets) via a bridge card. Depending on the embodiment, interface 417 may be any type of interface suitable for any type of network in which computer 410 is used. In some embodiments, interface 417 may include one or more interfaces for one or more I/O devices. One or more of these I/O devices may enable communication between a person and computer 410. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these.

Bus 412 may include any combination of hardware, software embedded in a computer readable medium, and/or encoded logic incorporated in hardware or otherwise stored (e.g., firmware) to couple components of computer 410 to each other. As an example and not by way of limitation, bus 412 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 412 may include any number, type, and/or configuration of buses 412, where appropriate. In particular embodiments, one or more buses 412 (which may each include an address bus and a data bus) may couple processor 411 to memory 413. Bus 412 may include one or more memory buses.

The flowchart and block diagrams in FIGS. 1-3 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed:

1. A system, comprising:
   a memory;
   an interface configured to communicate with a network;
   a processor configured to:
      receive, from a first source on the network, an unconfigured application;
      in response to receiving the unconfigured application, send a first request to a second source for configuration parameters associated with the unconfigured application;
      receive, from the second source in response to the first request, a first set of configuration parameters; and
      configure the unconfigured application using the first set of configuration parameters;
   wherein the first set of configuration parameters is associated with a first version, and wherein the processor is further configured to:
      determine that the first version is not current and a second version is current;
      send a second request to the second source for a second set of configuration parameters associated with the second version;
      receive, in response to the second request, the second set of configuration parameters; and
      re-configure the configured application using the second set of configuration parameters.

2. The system of claim 1, wherein:
   the processor is further configured to receive, from a third source on the network, information associated with the second source on the network; and
   sending the first request to the second source is performed using the information associated with the second source.

3. The system of claim 2, wherein:
   the information associated with the third source comprises a hyperlink; and
   the first request is sent to the third source using the hyperlink.

4. The system of claim 1, wherein the first request comprises identification information that includes a username and password.

5. The system of claim 1, wherein the processor is further configured to:
   send a second request to a third source for configuration parameters associated with the unconfigured application;
   receive, from the third source in response to the second request, a second set of configuration parameters; and
   configure the unconfigured application using the second set of configuration parameters.

6. The system of claim 1, wherein the configuration parameters include one or more of the following:
   a label associated with the configuration parameters;
   a version associated with the configuration parameters;
   attributes associated with communication on the network;
   image files to be used with an application installed on the first client;
   user information associated with a user of the first client;
   directories associated with the application installed on the first client; and
   parameters associated with functionality of the application installed on the first client.

7. A method, comprising:
   receiving, at a user's computer, from a first source on the network, an unconfigured application;
   in response to receiving the unconfigured application, sending, from the user's computer, a first request to a second source for configuration parameters associated with the unconfigured application;
   receiving, at the user's computer, from the second source in response to the first request, a first set of configuration parameters; and
   configuring, at the user's computer, the unconfigured application using the first set of configuration parameters.

8. The method of claim 7, the method further comprising receiving, from a third source on the network, information associated with the second source on the network, and wherein sending the first request to the second source is performed using the information associated with the second source.

9. The method of claim 8, wherein:
   the information associated with the third source comprises a hyperlink; and
   the first request is sent to the third source using the hyperlink.

10. The method of claim 7, wherein the first request comprises identification information that includes a username and password.

11. The method of claim 7, the method further comprising:
sending a second request to a third source for configuration parameters associated with the unconfigured application;
receiving, from the third source in response to the second request, a second set of configuration parameters; and
configuring the unconfigured application using the second set of configuration parameters.

12. The method of claim 7, wherein the first set of configuration parameters is associated with a first version, the method further comprising:
determining that the first version is not current and a second version is current;
sending a second request to the second source for a second set of configuration parameters associated with the second version;
receiving, in response to the second request, the second set of configuration parameters; and
re-configuring the configured application using the second set of configuration parameters.

13. The method of claim 7, wherein the configuration parameters include one or more of the following:
a label associated with the configuration parameters;
a version associated with the configuration parameters;
attributes associated with communication on the network;
image files to be used with an application installed on the first client;
user information associated with a user of the first client;
directories associated with the application installed on the first client; and
parameters associated with functionality of the application installed on the first client.

14. A computer program product comprising a computer readable storage medium having computer readable program code embodied therewith, the computer readable program code comprising:
computer readable program code configured to receive, from a first source on the network, an unconfigured application;
computer readable program code configured to send a first request to a second source for configuration parameters associated with the unconfigured application in response to receiving the unconfigured application;
computer readable program code configured to receive, from the second source in response to the first request, a first set of configuration parameters; and
computer readable program code configured to configure the unconfigured application using the first set of configuration parameters.

15. The computer program product of claim 14, wherein the computer readable program further comprises:
computer readable program code configured to receive, from a third source on the network, information associated with the second source on the network; and
computer readable program code configured to sending the first request to the second source is performed using the information associated with the second source.

16. The computer program product of claim 15, wherein:
the information associated with the third source comprises a hyperlink; and
the first request is sent to the third source using the hyperlink.

17. The computer program product of claim 14, wherein the first request comprises identification information that includes a username and password.

18. The computer program product of claim 14, wherein the computer readable program code further comprises:
computer readable program code configured to send a second request to a third source for configuration parameters associated with the unconfigured application;
computer readable program code configured to receive, from the third source in response to the second request, a second set of configuration parameters; and
computer readable program code configured to configure the unconfigured application using the second set of configuration parameters.

19. The computer program product of claim 14, wherein the first set of configuration parameters is associated with a first version, and wherein the computer readable program code further comprises:
computer readable program code configured to determine that the first version is not current and a second version is current;
computer readable program code configured to send a second request to the second source for a second set of configuration parameters associated with the second version;
computer readable program code configured to receive, in response to the second request, the second set of configuration parameters; and
computer readable program code configured to re-configure the configured application using the second set of configuration parameters.

20. The computer program product of claim 14, wherein the configuration parameters include one or more of the following:
a label associated with the configuration parameters;
a version associated with the configuration parameters;
attributes associated with communication on the network;
image files to be used with an application installed on the first client;
user information associated with a user of the first client;
directories associated with the application installed on the first client; and
parameters associated with functionality of the application installed on the first client.

* * * * *